(12) United States Patent
Kumar et al.

(10) Patent No.: US 10,285,156 B2
(45) Date of Patent: May 7, 2019

(54) DYNAMIC MEASUREMENT GAP CONFIGURATION FOR INTER-FREQUENCY POSITIONING MEASUREMENTS

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/482,813

(22) Filed: Apr. 9, 2017

(65) Prior Publication Data

US 2018/0295600 A1 Oct. 11, 2018

(51) Int. Cl.
*H04W 24/00* (2009.01)
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC ..... H04W 8/183; H04W 48/18; H04W 36/30; H04W 36/18; H04W 36/12; H04W 36/04; H04W 16/32; H04W 24/00; H04W 28/04; H04W 72/082; H04W 4/02; H04W 64/00; H04L 29/08657
USPC .... 455/432.1, 434, 435.3–453, 456.1–456.3; 370/329–334
See application file for complete search history.

(56) References Cited

U.S. PATENT DOCUMENTS

| 8,543,128 | B2* | 9/2013 | Jen | H04B 7/2606 |
| | | | | 455/422.1 |
| 9,182,493 | B2* | 11/2015 | Waters | G01S 19/05 |
| 2012/0083221 | A1 | 4/2012 | Ranta-Aho et al. | |
| 2012/0184290 | A1* | 7/2012 | Kazmi | G01S 5/0242 |
| | | | | 455/456.1 |
| 2012/0252487 | A1 | 10/2012 | Siomina et al. | |
| 2012/0307670 | A1* | 12/2012 | Kazmi | H04W 24/10 |
| | | | | 370/252 |
| 2013/0188510 | A1* | 7/2013 | Siomina | H04W 24/10 |
| | | | | 370/252 |
| 2013/0267246 | A1* | 10/2013 | Wang | H04W 24/10 |
| | | | | 455/456.1 |
| 2014/0094188 | A1* | 4/2014 | Kazmi | G01S 5/0242 |
| | | | | 455/456.1 |
| 2015/0208271 | A1 | 7/2015 | Love et al. | |

(Continued)

*Primary Examiner* — Dai Phuong
(74) *Attorney, Agent, or Firm* — Bala Ramasamy; Muncy, Geissler, Olds & Lowe, P.C.

(57) ABSTRACT

A method for performing inter-frequency positioning measurements on positioning signals periodically transmitted by at least some of a plurality of cells in a wireless communication network is provided. The method includes receiving, at a mobile device, assistance data that identifies a first neighbor cell the plurality of cells, where the first neighbor cell transmits a first positioning signal. The method also includes obtaining a first cell property of the first neighbor cell. The mobile device then adjusts a duration of a first measurement gap in response to the first cell property. In one aspect, the first measurement gap corresponds to a time period during which the mobile device is to perform positioning measurements of the first positioning signal.

28 Claims, 10 Drawing Sheets

(56) References Cited

U.S. PATENT DOCUMENTS

| | | | |
|---|---|---|---|
| 2016/0020840 A1* | 1/2016 | Kim | H04B 7/0413 |
| | | | 370/329 |
| 2016/0219453 A1* | 7/2016 | Harada | H04W 52/346 |
| 2017/0134904 A1* | 5/2017 | Fischer | H04W 4/023 |
| 2018/0132061 A1* | 5/2018 | Bitra | H04L 5/0048 |
| 2018/0132204 A1* | 5/2018 | Siomina | H04W 24/10 |

* cited by examiner

| N_PRS | Uplink-Downlink configuration | Downlink to uplink switch point periodicity | I_PRS | 0 | 1 | 2 | 3 | 4 | 5 | 6 | 7 | 8 | 9 |
|---|---|---|---|---|---|---|---|---|---|---|---|---|---|
| 1 | 0 | 5 ms | 0, 5 | D | S | U | U | U | D | S | U | U | U |
| 1 | 1 | 5 ms | 0, 4-5, 9 | D | S | U | U | D | D | S | U | U | D |
| 1 | 2 | 5 ms | 0, 3-5, 8-9 | D | S | U | D | D | D | S | U | D | D |
| 1 | 3 | 10 ms | 0, 5-9 | D | S | U | U | U | D | D | D | D | D |
| 1 | 4 | 10 ms | 0, 4-9 | D | S | U | U | D | D | D | D | D | D |
| 1 | 5 | 10 ms | 0, 3-9 | D | S | U | D | D | D | D | D | D | D |
| 1 | 6 | 5 ms | 0, 5-9 | D | S | U | U | U | D | S | U | U | D |
| 2 | 0 | 5 ms | Not Possible | D | S | U | U | U | D | S | U | U | U |
| 2 | 1 | 5 ms | 4, 9 | D | S | U | U | D | D | S | U | U | D |
| 2 | 2 | 5 ms | 3-4, 8-9 | D | S | U | D | D | D | S | U | D | D |
| 2 | 3 | 10 ms | 5-9 | D | S | U | U | U | D | D | D | D | D |
| 2 | 4 | 10 ms | 4-9 | D | S | U | U | D | D | D | D | D | D |
| 2 | 5 | 10 ms | 3-9 | D | S | U | D | D | D | D | D | D | D |
| 2 | 6 | 5 ms | 9 | D | S | U | U | U | D | S | U | U | D |
| 4 | 0 | 5 ms | Not Possible | D | S | U | U | U | D | S | U | U | U |
| 4 | 1 | 5 ms | Not Possible | D | S | U | U | D | D | S | U | U | D |
| 4 | 2 | 5 ms | Not Possible | D | S | U | D | D | D | S | U | D | D |
| 4 | 3 | 10 ms | 5-7 | D | S | U | U | U | D | D | D | D | D |
| 4 | 4 | 10 ms | 4-7 | D | S | U | U | D | D | D | D | D | D |
| 4 | 5 | 10 ms | 3-7 | D | S | U | D | D | D | D | D | D | D |
| 4 | 6 | 5 ms | Not Possible | D | S | U | U | U | D | S | U | U | D |
| 6 | 0 | 5 ms | Not Possible | D | S | U | U | U | D | S | U | U | U |
| 6 | 1 | 5 ms | Not Possible | D | S | U | U | D | D | S | U | U | D |
| 6 | 2 | 5 ms | Not Possible | D | S | U | D | D | D | S | U | D | D |
| 6 | 3 | 10 ms | 5 | D | S | U | U | U | D | D | D | D | D |
| 6 | 4 | 10 ms | 4-5 | D | S | U | U | D | D | D | D | D | D |
| 6 | 5 | 10 ms | 3-5 | D | S | U | D | D | D | D | D | D | D |
| 6 | 6 | 5 ms | Not Possible | D | S | U | U | U | D | S | U | U | D |

FIG. 5

DYNAMIC MEASUREMENT GAP CONFIGURATION FOR INTER-FREQUENCY POSITIONING MEASUREMENTS

FIELD OF DISCLOSURE

This disclosure relates generally to mobile communications and, in particular but not exclusively, relates to determining, at least in part, a position of a wireless mobile device.

BACKGROUND

The position of a mobile device (device), such as, for example, a cellular telephone, may be estimated based on information gathered from various systems. One such system may include the Global Positioning System (GPS), which is one example of a satellite positioning system (SPS). SPS systems such as GPS may include a number of space vehicles (SV) orbiting the earth. Another example of a system that may provide a basis for estimating the position of a mobile device is a cellular communication system including a number of base stations to support communications for a number of mobile devices.

A position estimate, which may also be referred to as a position "fix", for a mobile device may be obtained, for example, based at least in part on distances or ranges from the mobile device to one or more transmitters, and also based at least in part on the locations of the one or more transmitters. Such transmitters may comprise SVs in the case of an SPS and/or terrestrial base stations in the case of a cellular communication system, for example. Ranges to the transmitters may be based on one or more signals transmitted by the transmitters and received at the mobile device, and/or vice versa. The location of the transmitters may be ascertained, in at least some example implementations, based on the identities of the transmitters, which may be ascertained from one or more signals received from the transmitters.

In certain Code Division Multiple Access (CDMA) digital cellular networks, a position location capability may apply Advanced Forward Link Trilateration (AFLT) techniques. In certain example Wideband Code Division Multiple Access (WCDMA) and Long Term Evolution (LTE) networks a position location capability may apply Observed Time Difference Of Arrival (OTDOA) techniques.

LTE OTDOA positioning technology, by way of example, may use Positioning Reference Signals (PRS) to determine (e.g., measure, calculate, estimate, etc.) a Time Difference of Arrival (TOA) for the positioning signals received from neighboring cells to determine an OTDOA. In order to be able to measure the PRS signals from the serving cell and neighbor cells, a mobile device, may send an assistance data request to an OTDOA system server. Such a server may then send certain assistance data, e.g., possible indicating a suite of cells' information (e.g., Base Station Almanac (BSA) and timing information), to the mobile device. In this example, at least a portion of the information provided to the mobile device by way of such example assistance data may help the mobile device to identify which PRS(s) (cells, transceivers, etc.) to attempt to use for TOA measurements. Note, the terms mobile device, user equipment (UE), and mobile station (MS) are used interchangeably herein and unless otherwise specified are intended to cover any type of electronic device that may participate in the example techniques and/or systems provided herein.

In some instances, an OTDOA measurement may comprise a Reference Signal Time Difference (RSTD). An RSTD may, for example, indicate a relative timing difference between two cells (e.g., a reference cell and a neighbor cell), calculated as the smallest time difference between two subframe boundaries received from the two different cells. The PRS signals may be transmitted by their respective cells on the same carrier frequency (herein, referred to intra-frequency). In other instances, the PRS signals may be transmitted on different carrier frequencies (herein, referred to as inter-frequency). Thus, an RSTD measurement may be calculated for both "intra-frequency" PRS signals and "inter-frequency" PRS signals.

When performing inter-frequency measurements, the mobile device may be configured to either (1) create/use measurement gaps to decode the PRS of the neighbor cell on a single receive chain, or (2) use an alternate receive chain (if the mobile device is configured to use the alternate receive chain and the carrier aggregation combo for the serving cell and neighbor cell band is supported). The measurement gap refers to an interruption/window in the existing receive chain to allow the measurement of a particular PRS of the neighbor cell. Typically, the length of the measurement gap is fixed (e.g., 6 ms). However, a fixed length measurement gap may not be optimal for all cases. Furthermore, excessive current may be consumed when waking up the alternate receive chain periodically for the fixed length measurement gap to monitor the PRS of a neighbor cell.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Aspects of the present disclosure include a method, a mobile device, and a non-transitory computer-readable medium for adjusting a duration of a measurement gap based on a cell property of a neighbor cell for performing positioning measurements.

For example, according to one aspect, a method for performing inter-frequency positioning measurements on positioning signals periodically transmitted by at least some of a plurality of cells in a wireless communication network is provided. The method includes receiving, at a mobile device, assistance data that identifies a first neighbor cell of the plurality of cells, where the first neighbor cell transmits a first positioning signal. The method also includes obtaining a first cell property of the first neighbor cell. The mobile device then adjusts a duration of a first measurement gap in response to the first cell property. In one aspect, the first measurement gap corresponds to a time period during which the mobile device is to perform positioning measurements of the first positioning signal.

According to another aspect, a mobile device for performing inter-frequency positioning measurements on positioning signals periodically transmitted by at least some of a plurality of cells in a wireless communication network includes memory and a processing unit. The processing unit is coupled to the memory to access and execute instructions included in program code stored in the memory. The instructions are configured to direct the mobile device to (i) receive assistance data that identifies a first neighbor cell of the plurality of cells of the wireless communication network, where the first neighbor cell transmits a first positioning signal; (ii) obtain a first cell property of the first neighbor cell; and (iii) adjust a duration of a first measurement gap in response to the first cell property, where the first measurement gap corresponds to a time period during which the mobile device is to perform positioning measurements of the first positioning signal.

According to yet another aspect, a mobile device for performing inter-frequency positioning measurements on positioning signals periodically transmitted by at least some of a plurality of cells in a wireless communication network includes means for receiving, at the mobile device, assistance data that identifies a first neighbor cell of the plurality of cells, where the first neighbor cell transmits a first positioning signal. The mobile device also includes means for obtaining, at the mobile device, a first cell property of a first neighbor cell. Further included in the mobile device is a means for adjusting, at the mobile device, a duration of a first measurement gap in response to the first cell property, where the first measurement gap corresponds to a time period during which the mobile device is to perform positioning measurements of the first positioning signal.

In another aspect, a non-transitory computer-readable medium includes program code stored thereon for performing inter-frequency positioning measurements on positioning signals periodically transmitted by at least some of a plurality of cells in a wireless communication network. The program code includes instructions to (i) receive assistance data that identifies a first neighbor cell of the plurality of cells, where the first neighbor cell transmits a first positioning signal; (ii) obtain, at the mobile device, a first cell property of the first neighbor cell; and (iii) adjust, at the mobile device, a duration of a first measurement gap in response to the first cell property, where the first measurement gap corresponds to a time period during which the mobile device is to perform positioning measurements of the first positioning signal.

Other objects and advantages associated with the aspects and embodiments disclosed herein will be apparent to those skilled in the art based on the accompanying drawings and detailed description.

BRIEF DESCRIPTION OF THE DRAWINGS

The accompanying drawings are presented to aid in the description of various example embodiments and are provided solely for illustration of the embodiments and not limitation thereof.

FIG. 5 is a diagram illustrating various cell properties.

DETAILED DESCRIPTION

Figure 1:
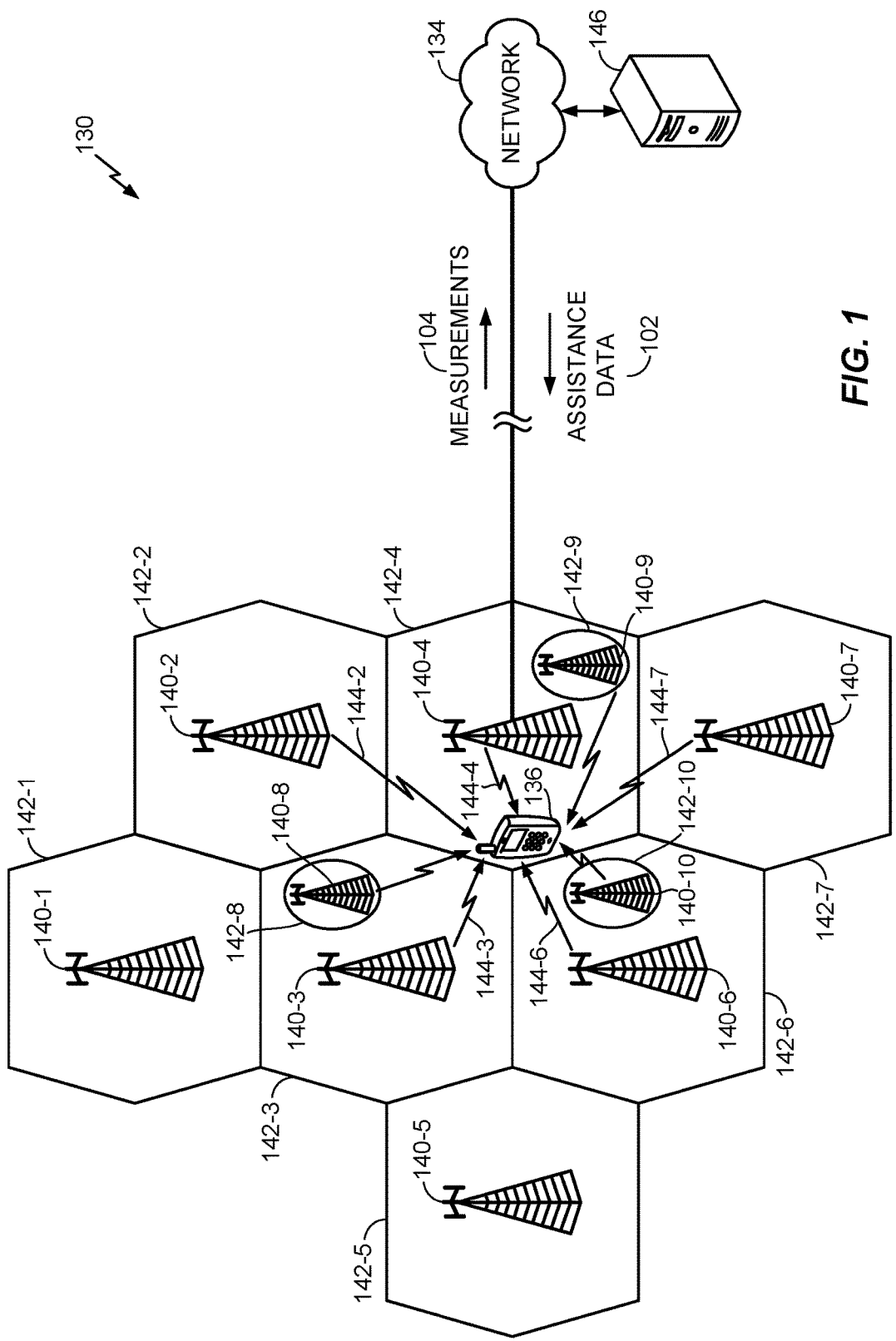
FIG. 1 is a functional block diagram of an example wireless communication network.

Various aspects are disclosed in the following description and related drawings directed to some example embodiments. Alternate embodiments may be devised without departing from the scope of this description. Additionally, well-known elements may not be described in detail or will be omitted so as not to obscure the relevant details of example techniques presented herein.

The word "exemplary" is used herein to mean "serving as an example, instance, or illustration." Any embodiment described herein as "exemplary" is not necessarily to be construed as preferred or advantageous over other embodiments. Further, the interchangeable terms "embodiment" and "implementation" do not require that all embodiments/implementations include the discussed feature, advantage, mode of operation, etc.

The terminology used herein is for the purpose of describing particular embodiments only and is not intended to be limiting of embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects presented herein may be embodied in a number of different forms, all of which have been contemplated to be within the scope of the claimed subject matter.

Although much of the description herein is drawn to examples in which a wireless communication system comprises a cellular communication system, it should be understood that the techniques provided herein may be applied in various manners within one or more other wireless communication systems. Thus, for example, techniques provided herein may be applied to or otherwise adapted to wireless networks having devices (e.g., access point devices, dedicated beacon transmitters, etc.) that transmit certain applicable types of position signals from known or discoverable locations. The terms "network" and "system" may be used interchangeably herein, as well, to represent the same aspect, for example, as in a wireless communication system and a wireless communication network.

FIG. 1 illustrates an example wireless communication network 130 according to one or more example embodiments. As shown, wireless communication network 130 includes a network of cells (e.g., cells 142-1 through 142-10), a network 134, a server 146 (e.g., representing all or part of one or more computing platforms), and one or more mobile devices 136. The cells (e.g., cells 142-1 through 142-10) may, for example, be configured to enable mobile device 136 to access services and devices associated with wireless communication network 130, possibly one or more external networks, such as the Public Switched Telephone Network (PSTN), the Internet, an intranet, etc., certain computing platform(s) or other like devices, or some combination thereof, which for the sake of this illustration may be represented, in whole or in part, by the cloud image of network 134.

Each cell (e.g., cells 142-1 through 142-10) may include at least one base station (e.g., base stations 140-1 through 140-10) or other like transceiver-configured access device. The base stations (e.g., base stations 140-1 through 140-10) may be geographically distributed across a wide geographic area served by wireless communication network 130. The base stations (e.g., base stations 140-1 through 140-10) may provide wireless coverage for one or more respective portions of that geographic area, referred to as cells (e.g., cells 142-1 through 142-10). Because of this, the mobile device 136 may move within or between cells (e.g., cells 142-1 through 142-10) and may communicate with one or more base stations (e.g., base stations 140-1 through 140-10) at a given position.

Different cells (e.g., cells 142-1 through 142-10) may have different nominal sizes/shapes, e.g., depending on the maximum transmit power utilized by the base stations (e.g., 140-1 through 140-10) serving those cells. For example, base station 140-1 may have a relatively large maximum transmit power and correspondingly serves mobile devices 136 within a relatively large cell 142-1, while base station 140-8 may have a relatively small maximum transmit power and correspondingly serves mobile devices 136 within a relatively small cell 142-8. In general, different base stations that have different pre-defined maximum transmit powers (and thereby serve cells of different nominal sizes) belong to different base station classes (e.g., a macro base station class, a micro base station class, a pico base station class, femto base station class, etc.).

Different base stations may operate on different carrier frequencies. For example, the base stations serving relatively large cells may operate on a certain carrier frequency F1 (for example, at 2 GHz), and base stations serving relatively small cells may operate on a carrier Frequency F2 (for example, at 3.5 GHz), different from carrier frequency F1. Such deployments with large cells (e.g., macro cells) and small cells (e.g., micro-, pico-, etc. cells) are often referred to as Heterogeneous Networks (HetNet). Using different carrier frequencies for the macro cell layer and small cell layer often simplifies network planning and reduces inter-cell interference. For example, it may avoid having a small cell layer interfere with a macro cell layer.

As shown in FIG. 1, mobile device 136, at its current illustrated position, may be served by base station 140-4 in the sense that the mobile device 136 may currently be configured to exchange data with the base station 140-4 (e.g., to place calls, access various services/networks, etc). Thus, base station 140-4 may transmit data to mobile device 136 on a particular frequency (referred to as the serving cell frequency) and over a particular bandwidth (known as the serving cell bandwidth). Thus, in this example, from the perspective of mobile device 136, base station 140-4 may be referred to as the serving base station and cell 142-4 is the serving cell. Other cells that may be geographically adjacent to or partially coincident with the serving cell 142-4 may be referred to as neighboring cells. In this example, all cells shown in FIG. 1 may be neighboring cells of cell 142-4, possibly with the exception of cells 142-1 and 142-5.

Each of the cells (e.g., cells 142-1 through 142-10) (via a respective base station) may periodically transmit a positioning signal (e.g., positioning signals 144-2, 144-3, 144-4, 144-6, and 144-7). A positioning signal may, for example, comprise a predetermined signal that may be known to both a cell transmitting that signal and, possibly with the aid of assistance data provided by the server 146, by mobile device 136 receiving the signal. Exemplary positioning signals 144-2, 144-3, 144-4, 144-6, and 144-7 may be transmitted on the same or different frequencies as one another. For example, positioning signal 144-2 may be transmitted by cell 142-2 on the same carrier frequency as positioning signal 144-3 that is transmitted by cell 142-3, while positioning signal 144-4 may be transmitted on a carrier frequency that is different from the carrier frequency used to transmit 144-6. A TOA measurement on positioning signals of the same frequency is referred to herein as an intra-frequency TOA measurement, while a TOA measurement on positioning signals of differing frequencies is referred to herein as an inter-frequency TOA measurement.

In some implementations a "carrier" may be defined in accordance with 3GPP TS 36.104 as "The modulated waveform conveying the E-UTRA or UTRA physical channels". The carrier frequency may be the center frequency of the transmitted positioning signal. In each operating band, there are multiple carrier frequencies possible (dependent on the particular standard, and region of the world), and the modulated positioning signal has a certain bandwidth. In operation, the mobile device tunes its radio to the desired carrier frequency, and demodulates the positioning signal. The carrier frequencies are usually arranged such that frequency bands do not overlap, e.g., if carrier frequency f1 uses a single-sided bandwidth of B1, then the spectrum required to transmit this signal is +/−B1, centered at f1. A separate carrier frequency f2 must then be outside of the spectrum covered by f1+/−B1, otherwise the two transmitted signals at f1 and f2 would overlap and interfere with each other. The carrier frequencies that are allowed are defined in the particular standard. The standard makes sure that the allowed carrier frequencies "make sense" (e.g., do not result in overlapping spectra, or any other restrictions).

The positioning signals (e.g., positioning signals 144-2, 144-3, 144-4, 144-6, and 144-7) transmitted by the cells in this exemplary manner may be acquired by mobile device 136 and used to determine positioning signal measurements, which may be used, at least in part, to determine a position of mobile device 136. For example, certain positioning signal measurements may be used, e.g., applied in a known multilateration technique or the like to determine a relative or other like coordinate based position location (e.g., a geographic position, etc.) of mobile device 136.

In one aspect, mobile device 136 may communicate with server 146 (e.g., possibly a location server) on network 134 for accomplishing, at least in part, such a purpose. Communication between mobile device 136 and server 146 may include, for example, one or more transactions between mobile device 136 and server 146. A transaction may pertain to a particular operation, such as the exchange of capabilities, the transfer of measurement(s) 104 (e.g., reference signal time difference (RSTD)) to server 146, the transfer of assistance data (AD) 102 from server 146 to mobile device 136 possibly for assisting mobile device 136 to perform certain positioning signal measurement(s), just to name a few examples.

Assistance data 102 may, for example, be generated or other obtained/stored by server 146 and transferred to the mobile device 136. Mobile device 136 may, in certain example implementations, attempt to determine one or more OTDOA measurements for one or more pairs of positioning signals (e.g., positioning signals 144-2, 144-3, 144-4, 144-6, and 144-7) from different cells (e.g., cells 142-1 through 142-10).

Figure 2A:
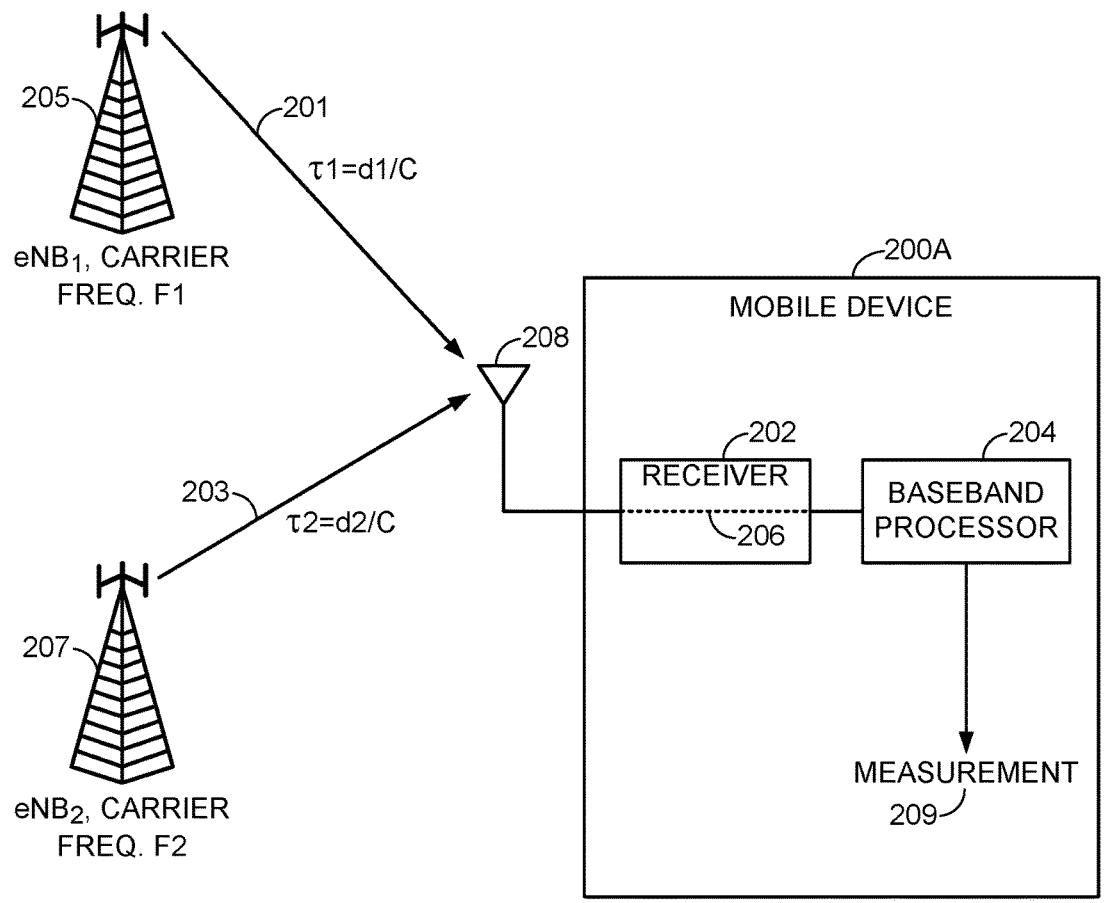
FIG. 2A is a functional block diagram of an example mobile device having a single receiver having a single receive path performing a measurement of a time difference of arrival of inter-frequency positioning signals, in accordance with an example implementation.

FIG. 2A is a functional block diagram of an exemplary mobile device 200A configured to perform an inter-frequency timing measurement of positioning signals 201 and 203 that are transmitted by respective base stations 205 and 207. Mobile device 200A represents a subset of features that may be provided in an example implementation of mobile device, such as, e.g., mobile device 136 of FIG. 1, while base stations 205 and 207 are illustrated examples representative of any of the base stations and/or other like transceiver devices that may be included in wireless communication network 130. More specifically, for this description, illustrated example of mobile device 200A includes an RF front end (e.g., represented by a receiver 202) and a baseband processor 204. As shown in FIG. 2A, base station 205 may be configured to transmit positioning signal 201 on carrier frequency F1, while base station 207 may be configured to transmit positioning signal 203 on carrier frequency F2, which is a separate and distinct frequency from frequency F1. The measured TOA ($\tau$) of each positioning signal will be indicative of the respective time that it took for the respective positioning signal to propagate the distance between the antenna of the transmitting base station and the antenna of the receiving mobile device. By way of example, a TOA $\tau 1$ for positioning signal 201 may be expressed as $\tau 1 = d1/C$, where d1 is the distance between base station 205 and antenna 208, and where C is the speed of light (in a vacuum). Similarly, a TOA $\tau 2$ for positioning signal 203 may be expressed as $\tau 2 = d2/C$, where d2 is the distance between base station 207 and antenna 208.

As shown in FIG. 2A, the receiver 202 includes a single receive path 206. In operation, the receiver 202 may be tuned to a particular frequency band where single receive path 206 can only monitor/receive signals on the currently tuned frequency band. Thus, in operation, the receiver 202 must be tuned to carrier frequency F1 to perform timing measurements of positioning signal 201 and then subsequently tuned to carrier frequency F2 to perform timing measurements of positioning signal 203. In the example of FIG. 2A, the mobile device 200A may be configured to utilize one or more measurement gaps to perform these timing measurements. The measurement gap may refer to time period during which the mobile device is to perform a particular timing measurement. A duration of the measurement gap may include the time necessary to receive and decode a positioning signal. For example, the mobile device 200A may implement a first measurement gap for performing the timing measurement of positioning signal 201. In the example of FIG. 2A, the receiver 202 may not begin a timing measurement of positioning signal 203 until the first measurement gap has ended.

Figure 2B:
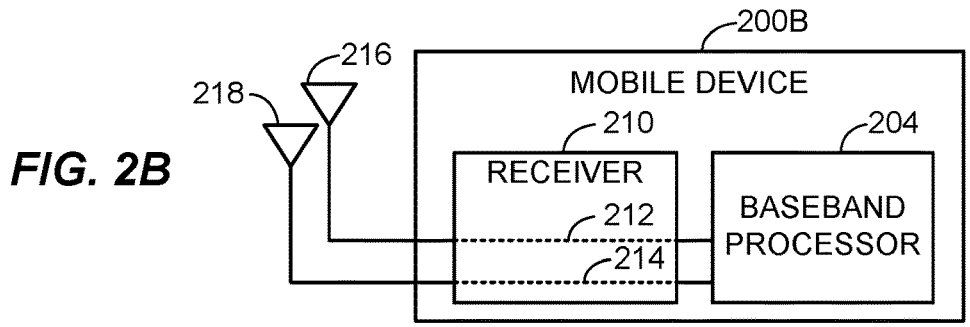
FIG. 2B is a block diagram of an example mobile device having a single receiver having multiple receive paths.

FIG. 2B is a block diagram of an example mobile device 200B having a single receiver 210 and antennas 216 and 218. As shown, receiver 210 includes multiple receive paths 212 and 214. Although FIG. 2B illustrates receiver 210 as including two receive paths, in other implementations receiver 210 may include any number of receive paths including two or more. In operation, the receiver 210 may be tuned to more than one frequency band, where receive path 212 may monitor/receive signals on a first frequency band and where receive path 214 may monitor/receive signals on a second frequency band that is the same or different from the first frequency band. Thus, in operation, the receiver 210 may be tuned to carrier frequency F1 to perform timing measurements of positioning signal 201 received via receive path 212, while concurrently tuned to carrier frequency F2 to perform timing measurements of positioning signal 203 via receive path 214. In the example of FIG. 2B, the mobile device 200B may be still be configured to utilize one or more measurement gaps to perform these timing measurements. That is, mobile device 200B may implement a first measurement gap for performing the timing measurement of positioning signal 201 received via receive path 212 and a second measurement gap for performing the timing measurement of the positioning signal 203 received via receive path 214. In the example of FIG. 2B, the receiver 210 may be configured to perform concurrent timing measurements of positioning signals 201 and 203.

Figure 2C:
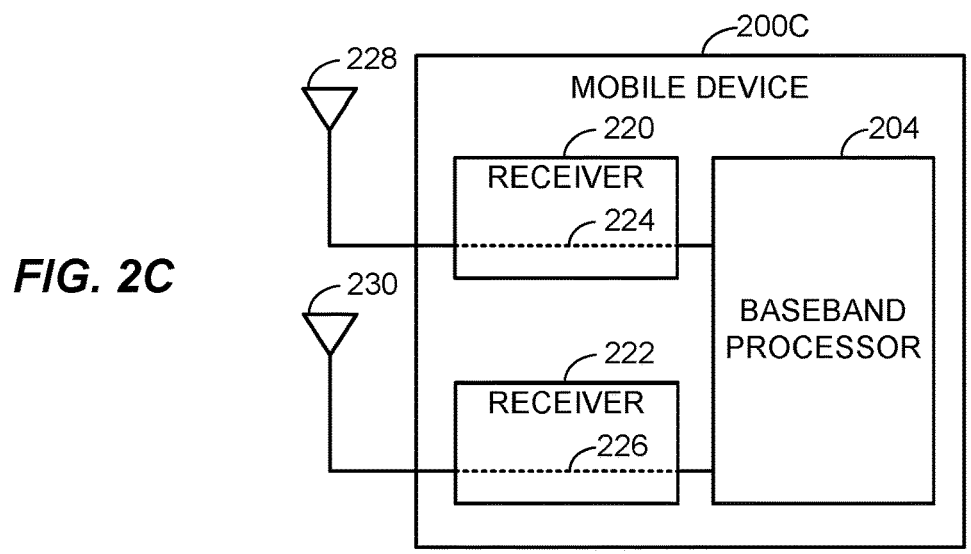
FIG. 2C is a block diagram of an example mobile device having multiple receivers where each receiver has a single respective receive path.

FIG. 2C is a block diagram of an example mobile device 200C having multiple receivers 220 and 222 as well as multiple antennas 228 and 230. As shown in FIG. 2C, each receiver 220 and 222 has a single receive path 224 and 226, respectively. Although FIG. 2C illustrates mobile device 200C as including two receivers, in other implementations mobile device 200C may include any number of receivers including two or more. In operation, the receiver 220 may be tuned to a first frequency band where receive path 224 can only monitor/receive signals on the first frequency band. Similarly, receiver 222 may be tuned to a second frequency band where the receive path 226 can only monitor/receive signals on the second frequency band. Thus, in operation, the receiver 220 may be tuned to carrier frequency F1 to perform timing measurements of positioning signal 201 received via receive path 224, while receiver 222 is concurrently tuned to carrier frequency F2 to perform timing measurements of positioning signal 203 via receive path 226. In the example of FIG. 2C, the mobile device 200C may be still be configured to utilize one or more measurement gaps to perform these timing measurements. That is, mobile device 200C may implement a first measurement gap for performing the timing measurement of positioning signal 201 received via receive path 224 and a second measurement gap for performing the timing measurement of the positioning signal 203 received via receive path 226. In the example of FIG. 2C, the mobile device 200C may be configured to perform concurrent timing measurements of positioning signals 201 and 203.

Figure 2D:
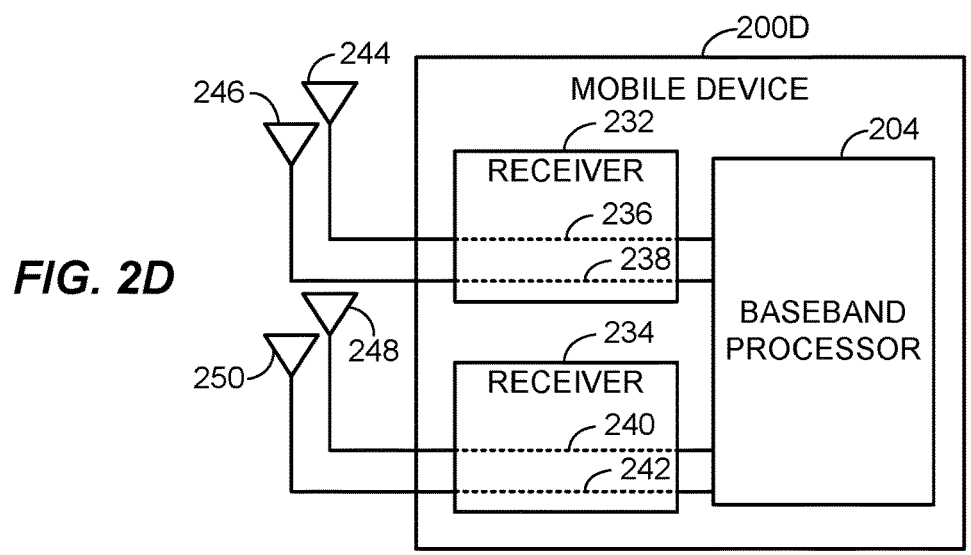
FIG. 2D is a block diagram of an example mobile device having multiple receivers where each receiver has multiple receive paths.

FIG. 2D is a block diagram of an example mobile device 200D having multiple receivers 232 and 234, as well as multiple antennas 244, 246, 248, and 250. As shown, receiver 232 includes multiple receive paths 236 and 238.

Similarly, receiver 234 includes multiple receive paths 240 and 242. Although FIG. 2D illustrates mobile device 200D as including two receivers, in other implementations mobile device 200D may include any number of receivers including two or more. Furthermore, although FIG. 2D illustrates receivers 232 and 234 as each including two receive paths, in other implementations one or more of the receivers 232 and 234 may include any number of receive paths including two or more. In operation, the receiver 232 may be tuned to more than one frequency band, where receive path 236 is may monitor/receive signals on a first frequency band and wherein receiver path 238 may monitor/receive signals on a second frequency band that is the same or different from the first frequency band. Similarly, the receiver 234 may be tuned to more than one frequency band, where receive path 240 is may monitor/receive signals on a third frequency band and wherein receive path 242 may monitor/receive signals on a fourth frequency band that is the same or different from the third frequency band. Thus, in operation, the receive path 236 of receiver 232 may be tuned to carrier frequency F1 to perform timing measurements of positioning signal 201 received, while any of the other illustrated receive paths 238-242 may be concurrently tuned to carrier frequency F2 to perform timing measurements of positioning signal 203. In the example of FIG. 2D, the mobile device 200D may be still be configured to utilize one or more measurement gaps to perform these timing measurements. That is, mobile device 200D may implement a first measurement gap for performing the timing measurement of positioning signal 201 received via receive path 236 and a second measurement gap for performing the timing measurement of the positioning signal 203 received via any of the other illustrated receive paths. In the example of FIG. 2D, the mobile device 200D may be configured to perform concurrent timing measurements of positioning signals 201 and 203.

As mentioned above, conventional systems may utilize a fixed measurement gap duration. In some conventional systems, this fixed measurement gap duration is configured by the location server to account for a worst case scenario (e.g., maximum amount of time needed to receive and decode a positioning signal). Thus, in this example, a conventional mobile device may utilize the same measurement gap duration for all cells identified in the assistance data. However, a fixed length measurement gap may not be optimal for all cases. Furthermore, excessive current may be consumed when waking up the alternate receive chain periodically for the fixed length measurement gap to monitor the positioning signal of a neighbor cell.

Figure 3A:
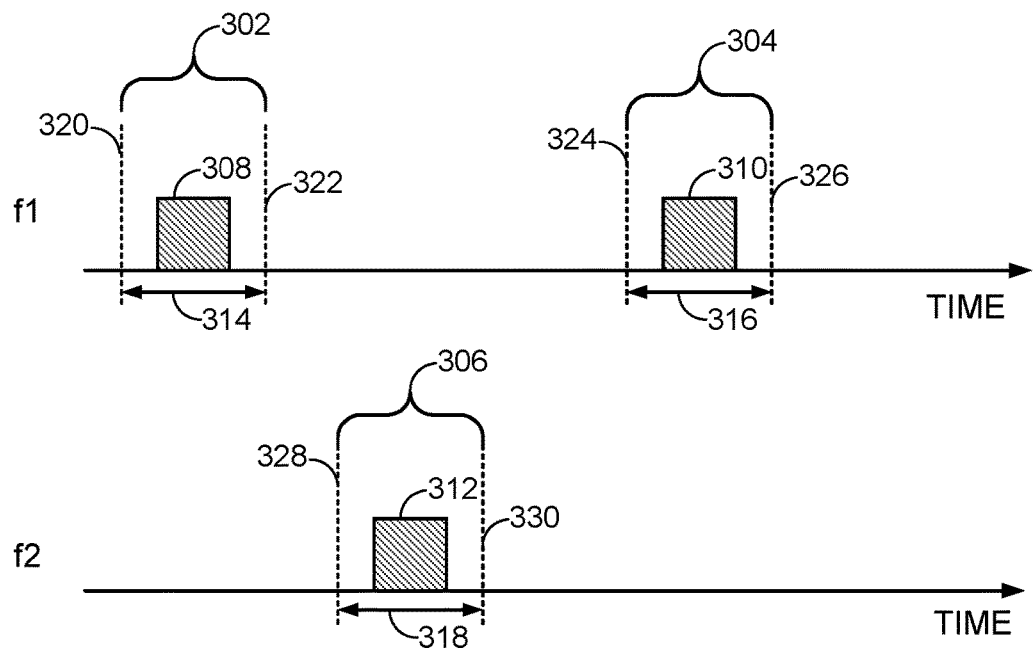
FIGS. 3A and 3B illustrate multiple measurement gaps for performing positioning measurements of respective positioning signals.
Figure 3B:
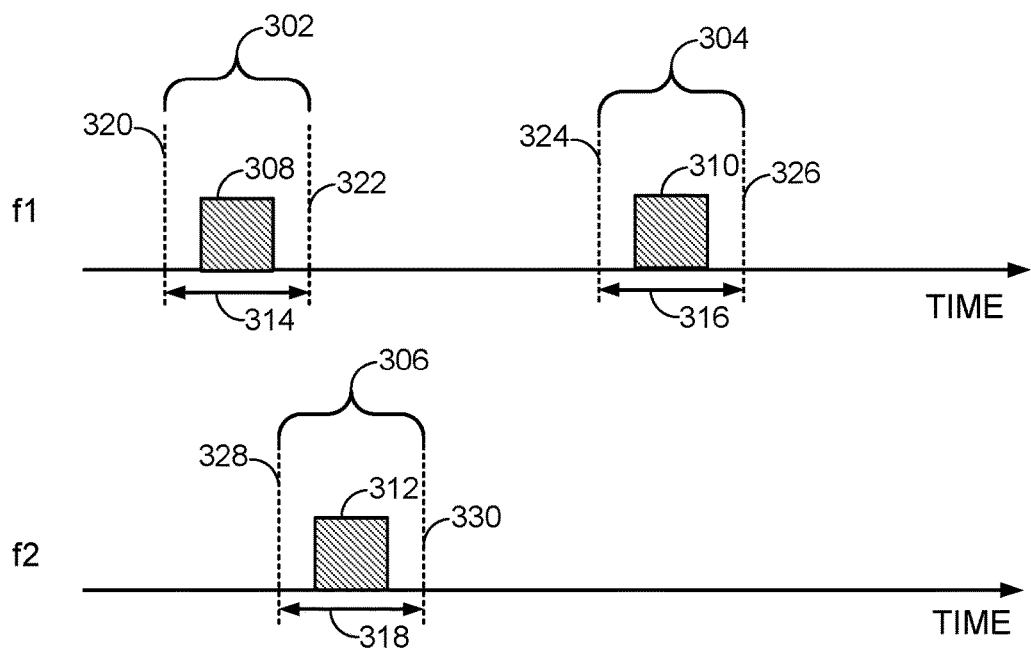

For example, FIGS. 3A and 3B illustrate multiple measurement gaps 302-306 for performing positioning measurements of respective positioning signals 308-312. As shown in FIGS. 3A and 3B, a first measurement gap 302 includes a start time 320 and an end time 322 that defines the duration 314 of the first measurement gap 302 (e.g., end time 322–start time 320=duration 314) for performing a positioning (i.e., timing) measurement of a first positioning signal 308. Similarly, a second measurement gap 306 includes a start time 328 and an end time 330 that defines the duration 318 of the second measurement gap 306 (e.g., end time 330–start time 328=duration 318) for performing a positioning measurement of a second positioning signal 312. Also shown in FIGS. 3A and 3B is a third measurement gap 304 that includes a start time 324 and an end time 326 that defines the duration 316 of the third measurement gap 304 (e.g., end time 326–start time 324=duration 316) for performing a positioning measurement of a third positioning signal 310.

In the example of FIG. 3A, a mobile device may receive assistance data from a location server that indicates that positioning measurements should be performed on a number of cells, including a first cell that transmits the first positioning signal 308 at a first frequency f1, a second cell that transmits the second positioning signal 312 at a second frequency f2 (f1≠f2), and a third cell that transmits the third positioning signal 310 at the first frequency f1. As shown in FIG. 3A, the first positioning signal 308 and the second positioning signal 312 are sufficiently spaced apart in time, such that the mobile device can measure both on a single RF receive chain. For example, the first positioning signal 308 is sufficiently space apart in time from the second positioning signal 312 because the first measurement gap 302 does not overlap with the second measurement gap 306 (i.e., end time 322 of the first measurement gap 302 occurs before the start time 328 of the second measurement gap 306). As mentioned above, conventional systems may utilize a fixed measurement gap duration. Thus, in a conventional mobile device, the durations 314, 316, and 318 may be the same (i.e., duration 314=duration 316=duration 318). However, using the same duration for all measurement gaps may not be optimal as the same duration may not be needed for measuring all of the positioning signals. Thus, unnecessary power may be consumed by the mobile device keeping the receive chain powered on for longer than needed for measuring at least some of the positioning signals.

The example of FIG. 3B illustrates a scenario where the first positioning signal 308 and the second positioning signal 312 are either aligned in time, or at least overlap (i.e., end time 322 of the first measurement gap 302 occurs after the start time 328 of the second measurement gap 306). For the example of FIG. 3B, conventional systems cannot stagger inter-frequency and intra-frequency RSTD measurements. Instead, these systems will perform all intra-frequency measurements first and then proceed to inter-frequency measurements. Thus, a mobile device that includes only a single receive chain, such as mobile device 200A of FIG. 2A, may be configured to utilize measurement gaps to perform the inter-frequency measurement gaps. However, since the first measurement gap 302 overlaps with the second measurement gap 306, the mobile device has to wait to perform the positioning measurements on the second positioning signal 312. This may result in increased time to acquire all positioning measurements (as shown above in FIG. 3B, the mobile device has to wait to perform the positioning measurements of the second positioning signal 312).

Even still, a mobile device that includes multiple receive chains, such as mobile device 200B of FIG. 2B, may be configured to perform concurrent positioning measurements of the first positioning signal 308 and the second positioning signal 312 (e.g., mobile device 200B may be configured to perform a positioning measurement of the first positioning signal 308 via receive path 212, while simultaneously performing a positioning measurement of the second positioning signal 312 via receive path 214). However, as mentioned above, in a conventional mobile device, the durations 314, 316, and 318 may be the same. Using the same duration for all measurement gaps may not be optimal as the same duration may not be needed for measuring all of the positioning signals. Thus, unnecessary power may be consumed by the mobile device keeping one or both of the utilized receive chains powered on for longer than needed for measuring at least some of the positioning signals.

Accordingly, aspects of the present disclosure include a mobile device that is configured to dynamically adjust the duration of at least one measurement gap used for positioning measurements based, at least in part, on a cell property of the cell that transmits the positioning signal. As will be described below, the cell property may indicate a number of consecutive subframes of the positioning signal that are used for positioning measurements. In other examples, the start time of the measurement gap may be dynamically adjusted by the mobile device based, in part, on a subframe index of the positioning signal used for positioning signal and/or on an uplink-downlink configuration type of the positioning signal. Thus, according to some aspects of the present disclosure, the duration of one or more of the utilized measurement gaps may be reduced such that the RF receive path may be turned off after the positioning measurement is complete. The shortened duration of the measurement gap may significantly reduce the power consumed by the mobile device and may also reduce the number of occasions where measurement gaps overlap for inter-frequency positioning measurements.

Figure 4A:
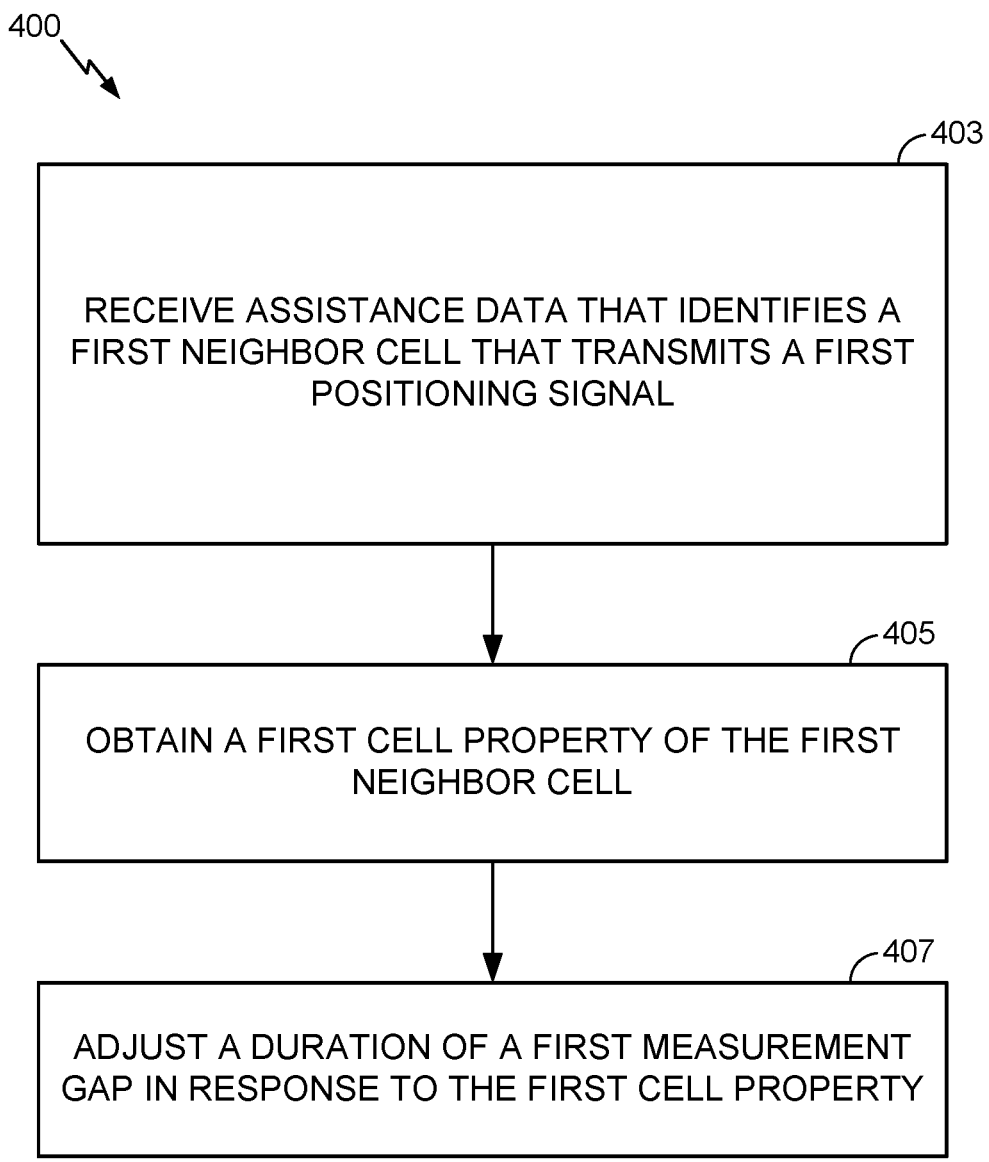
FIG. 4A is a flowchart illustrating an example process, by a mobile device, of performing positioning measurements.

FIG. 4A is a flowchart illustrating an example process 400, by a mobile device (e.g., mobile device 136 of FIG. 1, and/or any of the mobile devices 200A-D of FIGS. 2A-2D), of performing positioning measurements. In process block 402, the mobile device 136 receives assistance data (e.g., assistance data 102 of FIG. 1) that identifies a first neighbor cell (e.g., cell 142-2 of FIG. 1, and/or base station 205 of FIG. 2A). In one aspect, process block 402 may be performed by one or more components of the mobile device, such as a transceiver, CPU, and/or a position determination unit (e.g., see transceiver 770, CPU 720, and/or position determination unit 725 of FIG. 7, discussed in more detail below). In one example, the assistance data 102 may further identify a second neighbor cell (e.g., cell 142-7 of FIG. 1, and/or base station 207 of FIG. 2A). As discussed above, the first neighbor cell may be configured to transmit a first positioning signal (e.g., positioning signal 201 of FIG. 2A) at a first frequency f1 and the second neighbor cell may be configured to transmit a second positioning signal (e.g., positioning signal 203 of FIG. 2A) at a second frequency f2.

In process block 404, the mobile device 136 obtains a first cell property of the first neighbor cell. In one aspect, process block 404 may be performed by one or more components of the mobile device, such as a transceiver, CPU, and/or a memory (e.g., see transceiver 770, CPU 720, and/or memory 730 of FIG. 7). In one example, first cell property is included in the assistance data received from a location server (e.g., assistance data 102 received from location server 146 of FIG. 1). In another example, the first cell property may be included in information periodically broadcast by the neighbor cell, itself. Thus, a transceiver of the mobile device may receive one or more cell properties directly from the neighbor cell and cache this information locally (e.g., within memory) at the mobile device. Then, when the mobile device receives the assistance data from the server, the mobile device may retrieve the corresponding cell properties stored in cache for the corresponding neighbor cell identified in the assistance data.

Figure 4B:
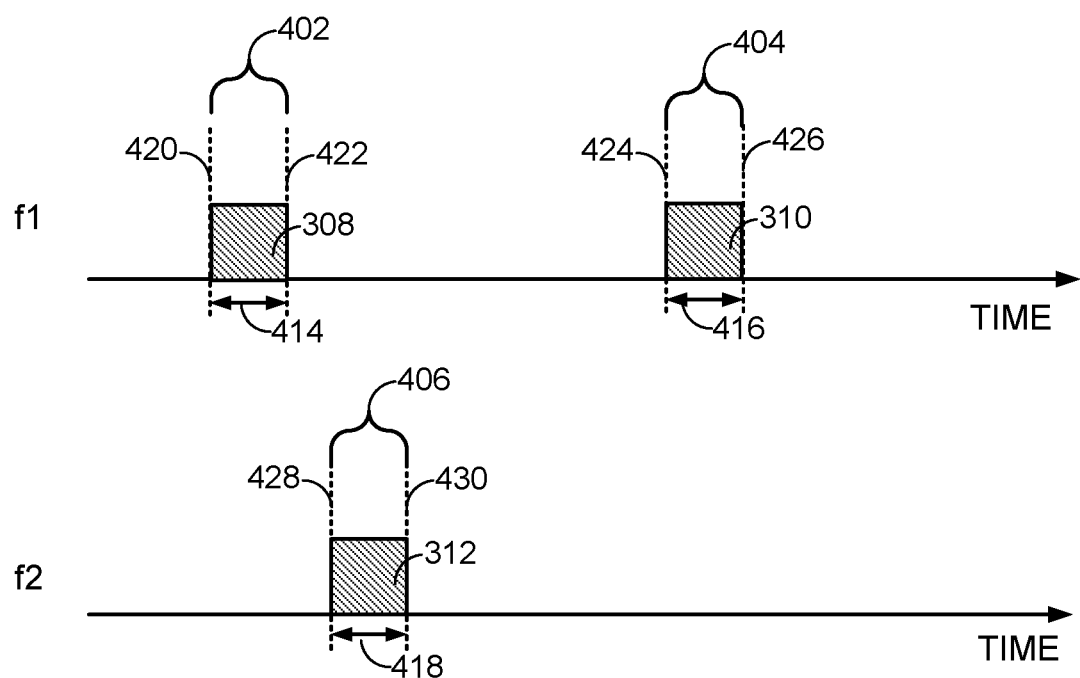
FIG. 4B illustrates dynamically adjusted measurement gaps for performing positioning measurements of respective positioning signals.

In process block 406, the mobile device 136 then adjusts a duration of a first measurement gap based on the first cell property, where the first measurement gap corresponds to a time period during which the mobile device is to perform positioning measurements of the first positioning signal. In one aspect, process block 406 may be performed by one or more components of the mobile device, such as a CPU, a position determination unit and/or a memory (e.g., see CPU 720, position determination unit 725, and/or memory 730 of FIG. 7. For example, FIG. 4B, illustrates dynamically adjusted measurement gaps 402-406 for performing positioning measurements of respective positioning signals 308-312. In one aspect, the positioning signals 308-312 correspond to the same positioning signals illustrated in FIG. 3B. As shown in FIG. 4B, the mobile device 136 may adjust the duration 414 of the first measurement gap 402 based on a cell property of the cell that transmits the first positioning signal 308. In some aspects, the mobile device 136 may adjust more than one measurement gap for the cells identified in the assistance data. For example, the mobile device 136 may also adjust the duration 418 of measurement gap 406 based on a cell property of the cell that transmits the second positioning signal 312 and/or the duration 416 of the measurement gap 404 based on a cell property of the cell that transmits the third positioning signal 310. In one example, adjusting the duration of a measurement gap includes decreasing the duration of the measurement gap. Thus, in some examples, the mobile device 136 may adjust the durations of one or more of the measurement gaps 402, 404, and/or 406 such that they are not all equal (e.g., duration 414≠duration 418, duration 414≠duration 416, duration 416≠duration 418, and/or duration 414≠duration 416≠duration 418). As discussed above, decreasing the duration of one or more of the measurement gaps 402-406 may decrease the amount of time needed to keep a respective receive path powered on and thus, reducing the amount of power consumed by the mobile device.

Decreasing the duration of the one or more of the measurement gaps 402-406 may also reduce the occasions where the measurement gaps overlap. For example, with reference to FIG. 4B, reducing the duration of measurement gap 402 (as compared to measurement gap 302 of FIG. 3B), such that the end time 422 occurs before start time 428 may eliminate the overlap with measurement gap 406. In this case, the positioning measurement of the second positioning signal 312 would not have to be delayed and may be performed by the mobile device as soon as measurements of the first positioning signal 308 are completed.

As will be discussed in more detail below, in addition to adjusting the duration of a measurement gap, the mobile device 136 may be further configured to adjust the start times 420, 424, and/or 428 of one or more of the measurement gaps based, again, on one or more cell properties.

FIG. 5 is a diagram illustrating various cell properties that may be utilized by a mobile device (e.g., mobile device 136) to adjust the duration, and optionally a start time, of one or more measurement gaps. As discussed above, each cell in a wireless communication network may periodically transmit a positioning signal to enable a mobile device to perform positioning measurements. For example, in LTE OTDOA positioning technology, each cell may be configured to transmit Position Reference Signals (PRS) according to a respective PRS configuration. As used herein, a cell property may refer to one or more properties identified in the PRS configuration of a respective cell that dictates the format and/or timing of the PRS transmitted by that cell. For example, FIG. 5 illustrates various combinations of cell properties for possible cells in a wireless communication network, such as Nprs 502, Uplink-Downlink (UL-DL) configuration type 504, Downlink to Uplink Switch point periodicity 506, and Iprs 508. In one example, Nprs 502 refers to the number of consecutive subframes of the positioning signal that are used for positioning measurements. Thus, an Nprs 502 value of 1 (one) indicates a positioning signal with 1 consecutive subframe that is used for positioning measurements. Similarly, an Nprs 502 value of 4 indicates a positioning signal with 4 consecutive subframes that are used for positioning measurements.

In some aspects, the Iprs 508 refers to a subframe index of the positioning signal used for positioning measurements. For example, an Iprs 508 value of 0 (zero) indicates that subframe 0 is the beginning subframe of the positioning signal used for positioning measurements. By way of another example, an Iprs 508 value of 2 indicates that PRS starts from subframe 2.

In some aspects, the Nprs 502 value and the Iprs 508 value may be included in the assistance data that is received by the mobile device. That is, a server, such as location server 146, may prepare the assistance data 102 to include a list of cells on which the mobile device is to perform positioning measurements as well as a corresponding Nprs and Iprs value for each.

The UL-DL configuration type 504 refers to a particular arrangement (order) of the downlink, uplink, and switching subframes broadcast by a particular cell. Column 510 of FIG. 5 illustrates the various arrangements of downlink (D), uplink (U), and switching subframes (S) for each UL-DL configuration type (0-6). In one example, the downlink to uplink switch point periodicity 506 is dependent on the UL-DL configuration type 504. That is, the pattern of downlink, uplink, and switching subframes indicated by the UL-DL configuration type 504 may govern the switching periodicity 506.

Accordingly, FIG. 5 illustrates several cell properties that may be utilized by the mobile device 136 to adjust the duration, and optionally a start time, of one or more measurement gaps used for positioning measurements. By way of example, the mobile device 136 may be configured to adjust the duration of a measurement gap based on the Nprs 502 value. Continuing with this example, in some wireless communication systems, each downlink subframe with PRS may require a 1 ms window for measuring the PRS. Thus, as can be seen, an Nprs 502 value of 6 (i.e., 6 consecutive downlink subframes with PRS) may correspond to a 6 ms measurement gap needed to measure the PRS. Thus, as mentioned above, some conventional systems may fix all measurement gaps at 6 ms to ensure adequate time to measure the PRS during this worst case scenario. However, as can be seen from FIG. 5, not all cells are configured to transmit a PRS with an Nprs 502 value of 6. Accordingly, the mobile device 136 may dynamically adjust the duration of a measurement gap based on the Nprs 502 value specific to the cell that is transmitting the PRS.

For example, referring back to FIG. 4B, assume that the first positioning signal 308 is transmitted by a cell having an Nprs 502 value of 3, the second positioning signal 312 is transmitted by a cell having an Nprs 502 value of 4, and the third positioning signal 310 is transmitted by a cell having an Nprs 502 value of 6. In this example, the mobile device 136 may adjust the duration 414 of the first measurement gap 402 to 3 ms, the duration 418 of the second measurement gap 406 to 4 ms, and the duration 416 of the third measurement gap 404 to 6 ms.

In some examples, the mobile device 136 may be further configured to adjust the start time of a measurement gap based on the UL-DL configuration type 504 and/or the Iprs 508 value. Accordingly, the mobile device 136 may dynamically adjust the start time of a measurement gap based on the UL-DL configuration type 504 and/or the Iprs 508 value specific to the cell that is transmitting the PRS.

For example, referring back to FIG. 4B, assume that the second positioning signal 312 is transmitted by a cell having an Iprs 502 value of 5. In this example, since the mobile device 136 now knows that the subframe index is 5, the mobile device 136 may adjust (e.g., delay) the start time 428 of the second measurement gap 406, such that it no longer overlaps with the first measurement gap 402 (e.g., as compared to the example of FIG. 3B).

Furthermore, conventional wireless communication systems may fix the measurement gap duration irrespective of the band type. That is, some cells in a wireless communication system (e.g., wireless communication system 130) may be configured to communicate according to a frequency division duplex (FDD) protocol, while others may be configured to communicate according to a time division duplex (TDD) protocol. Thus, according to some aspects of the present disclosure, a mobile device, such as mobile device 136 may be configured to prioritize positioning measurements of positioning signals transmitted by neighbor cells that are configured to communicate according to the TDD protocol over neighbor cells that are configured to communicate according to the FDD wireless protocol. By way of example, referring back to FIG. 1, mobile device 136 may obtain an additional cell property that indicates whether cells 142-2, 142-4, 142-6, and 142-7 communicate according to the TDD wireless protocol or the FDD wireless protocol. In this example, the additional cell properties may indicate that cells 142-2 and 142-4 communicate according to a TDD wireless protocol whereas cells 142-6 and 142-7 communicate according to a FDD wireless protocol. Thus, mobile device 136 may be configured to perform the positioning measurements of positioning signals 144-2 and 144-4 before performing the positioning measurements of positioning signals 144-6 and 144-7.

In addition, a mobile device, according to the present disclosure, may further be configured to select neighbor cells for performing positioning measurements based on an alignment with a neighbor cell's UL subframe. For example, mobile device 136 may determine whether a duration of the first measurement gap for the first positioning signal aligns with an uplink (UL) subframe of the another neighbor cell based, in part, on the UL-DL configuration type 504. If so, the mobile device 136 may select the cell that transmits the first positioning signal for positioning measurements. In some aspects, aligning the first measurement gap with the UL subframe of another neighbor cell may allow the mobile device 136 to continue using the neighbor cells RX resources (e.g., RX chain) during the positioning measurements.

Aspects of the present disclosure further recognize that with multiple carriers in the carrier aggregation scenario, the mobile device 136 will have multiple carriers with different UL-DL configuration types. Thus, when performing a positioning measurement of a neighbor cell, the mobile device 136 may be configured to perform the positioning measurements using the RF resources of the carrier which has UL subframes, or expected consecutive UL subframes occurring shortly. For example, as discussed above, mobile device 136 may be configured to enter a carrier aggregation mode where multiple receive chains are utilized for performing inter-frequency positioning measurements. Referring to FIG. 5, assume that a first receive chain of the mobile device 136 is designated to perform a positioning measurement of a first positioning signal that has an Nprs 502 value of 1, an UL-DL configuration type 504 of 5, an Iprs 508 value of 3. With the first receive chain being utilized to perform positioning measurements of the first positioning signal, the mobile device 136 may select a second positioning signal to measure on a second receive chain. If the assistance data identifies several other cells to perform positioning measurements, the mobile device 136 may select from among the identified cells to perform such positioning measurements on the second receive chain. In one example, a second positioning signal identified in the assistance data has an Nprs 502 value of 1 and an UL-DL configuration type 504 of 1. However, as can be seen from FIG. 5, during subframe 3 of the second positioning signal, the UL-DL configuration type 504 of the second positioning signal indicates that this subframe will be an UL subframe. In otherwords, while the mobile device 136 is performing positioning measurements of the first positioning signal on the first receive chain during subframe 3, the second positioning signal will be an UL subframe. Thus, rather than selecting the second positioning signal for positioning measurements on the second receive chain, the mobile device 136 may select a third positioning signal, such as one that includes a corresponding download (DL) subframe during the subframe 3. For example, the mobile device 136 may select a third positioning signal that includes an Nprs 502 value of 1 and an UL-DL configuration type 504 of 2 for performing positioning measurements on the second receive chain since subframe 3 of the third positioning signal also indicates a DL subframe. In this way, the mobile device 136 may efficiently compact positioning measurements when utilizing multiple receive chains, which may reduce the time to perform all the positioning measurements and/or may reduce overlap between measurement gaps.

Figure 6:
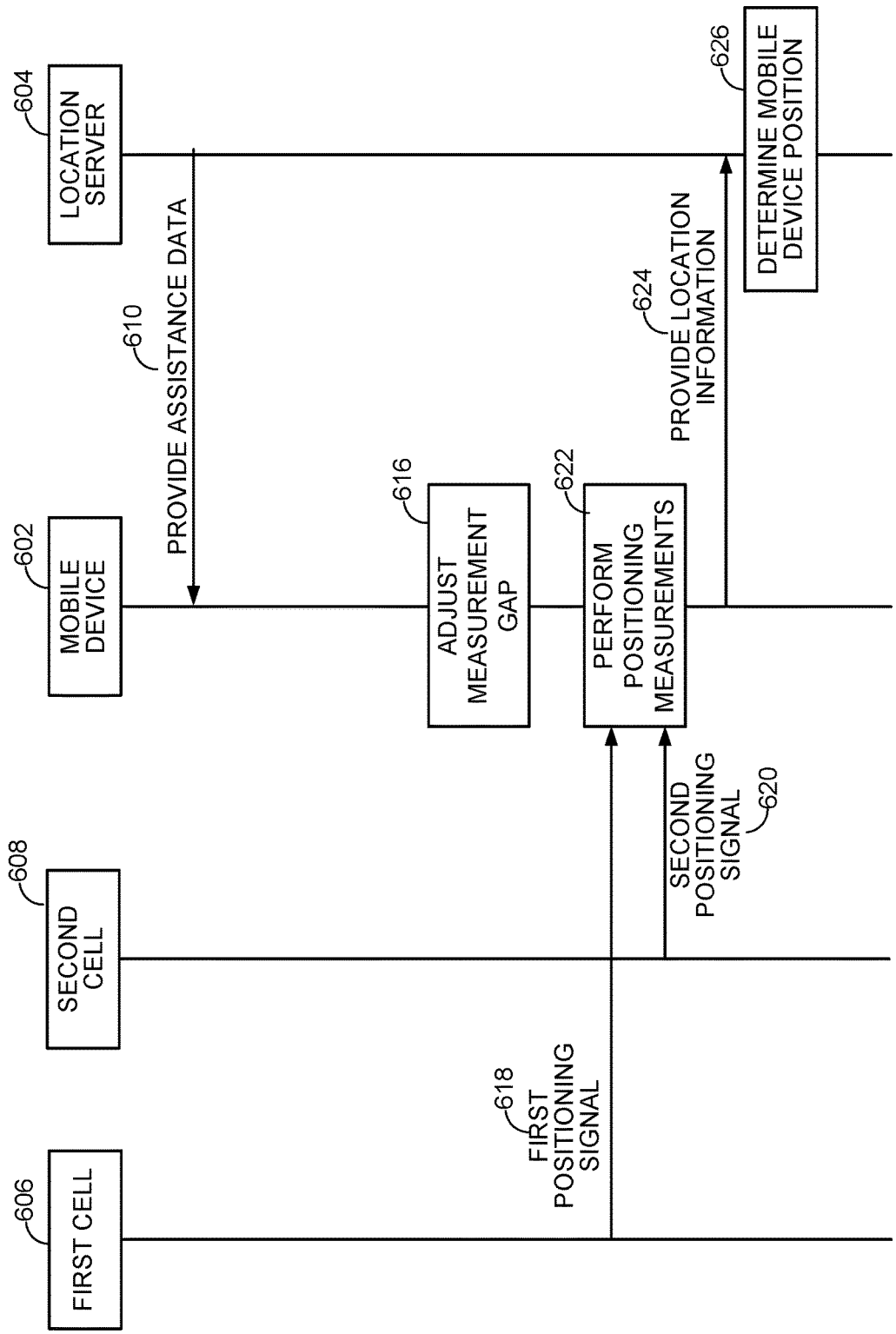
FIG. 6 is a diagram illustrating an example flow for use in determining a position of a mobile device.

FIG. 6 is a diagram illustrating an example flow for use in determining a position of a mobile device (e.g., such as mobile device 136 in FIG. 1). The example flow illustrated in FIG. 6 may correspond to the process 400 of FIG. 4A. As shown, a location server 604 may provide assistance data 610 to the mobile device 602. In some examples, the assistance data 601 is provided to the mobile device 602 in response to an assistance data request message generated by the mobile device 602, itself. The assistance data may identify the cells with which the mobile device 602 is to perform positioning measurements with, as well as a corresponding cell properties, such as the Nprs and Iprs value for each.

Next, in block 616 the mobile device 616 adjusts one or more measurement gaps based on the cell properties. For example, as discussed above, the mobile device 602 may adjust a duration of a measurement gap based on the Nprs value, a start time of a measurement gap based on the Iprs value, and/or a start time of a measurement gap based on the UL-DL configuration type. Next, in block 622, the mobile device 602 may perform one or more positioning measurements on the first positioning signal 618 and the second positioning signal 620. In one example, performing the positioning measurements includes receiving and decoding the first and second positioning signals 618 and 620 during their respective adjusted measurement gaps. In one aspect, receiving and decoding a positioning signal includes determining a time of arrival of the positioning signal. Further aspects performed by the mobile device may include determining an observed time difference of arrival (OTDOA) between the first positioning signal 618 and the second positioning signal 620.

Next, at 624, the mobile device 602 provides the location information to the location server 604. In one aspect the location information may include the measurements of the time of arrival of each positioning signal and/or the OTDOA. In block 626, the location server 604 then determines a location (i.e., position) of the mobile device 602.

Figure 7:
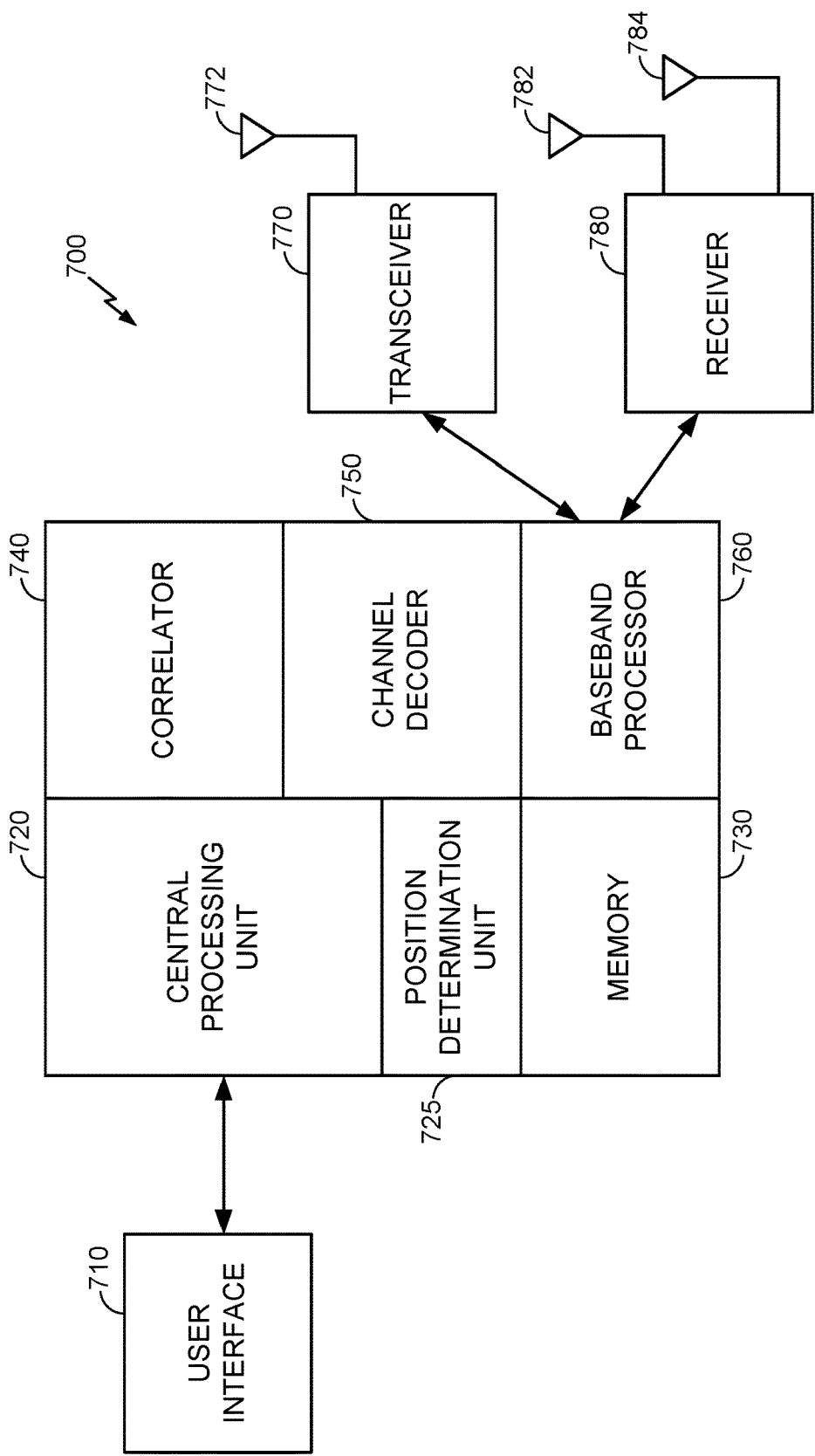
FIG. 7 is a functional block diagram showing certain features of an example mobile device.

FIG. 7 is a functional block diagram showing certain features of an example mobile device 700. Additionally, mobile device 700 is one possible implementation of mobile device 136 of FIG. 1, any of mobile devices 200A-200D of FIGS. 2A-2D, or mobile device 602 of FIG. 6.

One or more transceivers 770 may be configured to modulate an RF carrier signal with baseband information, such as voice or data, onto an RF carrier, and demodulate a modulated RF carrier to obtain such baseband information. An antenna 772 may be configured to transmit a modulated RF carrier over a wireless communication link and receive a modulated RF carrier over a wireless communication link. In one embodiment, antenna 772 may be configured to transmit cellular timing information and/or assistance data requests to a base station (e.g., base station 140-4 of FIG. 1) and receive assistance data from a base station.

A baseband processor 760 may be configured to provide baseband information from a central processing unit (CPU) 720 to the transceiver 770 for transmission over a wireless communication link. Here, the CPU 720 may obtain such baseband information from an input device within a user interface 710. The baseband processor 760 may also be configured to provide baseband information from the transceiver 770 to the CPU 720 for transmission through an output device within the user interface 710.

The user interface 710 may comprise one or more devices for inputting or outputting user information such as voice or data. Such devices may include, by way of non-limiting examples, a keyboard, a display screen, a microphone, and a speaker.

A receiver 780 may be configured to receive and demodulate transmissions from an SPS via one or more antennas 782 and 784, and provide demodulated information to correlator 740. Correlator 740 may be configured to derive correlation functions from the information provided by receiver 780. Correlator 740 may be configured to derive pilot-related correlation functions from information relating to pilot signals provided by the transceiver 770. This information may be used by the mobile device to acquire wireless communication services. A channel decoder 750 may be configured to decode channel symbols received from baseband processor 760 into underlying source bits. In one example, where channel symbols comprise convolutionally encoded symbols, channel decoder 750 may comprise a Viterbi decoder. In a second example, where channel symbols comprise serial or parallel concatenations of convolutional codes, channel decoder 750 may comprise a turbo decoder.

A memory 730 may be configured to store machine-readable instructions which are executable to perform one or more of processes, implementations, or examples thereof which are described or suggested herein. The CPU 720 and/or the baseband processor 760 may be configured to access and execute such machine-readable instructions.

Mobile device 700 may include a position determination unit 725 that may be configured to perform positioning signal measurements and/or assistance data processing. In one example, the position determination unit 725 may be configured to generate assistance data requests and to initiate transmission of such request(s) to a base station via the transceiver 770. In another example, position determination unit 725 may process assistance data received via transceiver 770. In yet another example position determination unit 725 may adjust one or more measurement gaps and perform measurements of positioning signals during the adjusted measurement gaps. Position determination unit 725 and the baseband processor 760 are illustrated separately for clarity, but may be a single unit. Indeed, it should be clear that, in certain implementations, all or part of one or more of the example features illustrated in FIG. 7 may be combined or otherwise share common components, etc.

The CPU 720, as well as one or more of position determination unit 725, correlator 740, channel decoder 750, and baseband processor 760 can, but need not necessarily include, one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with mobile device 700, and is not to be limited to any particular type of memory or number of memories, or type of media upon which memory is stored.

Figure 8:
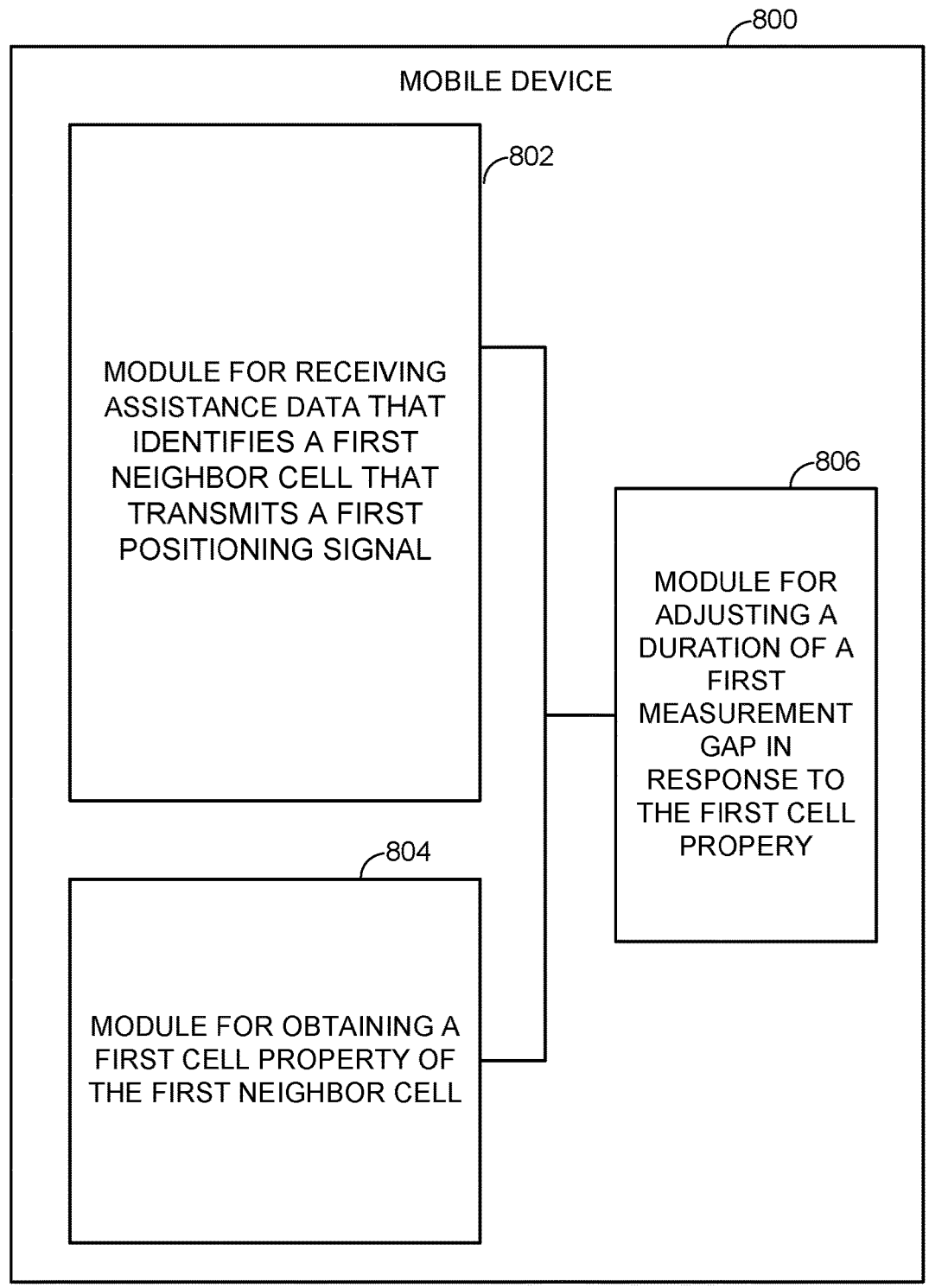
FIG. 8 illustrates several sample aspects of components that may be employed in an mobile for use in a wireless communication network.

FIG. 8 illustrates several sample aspects of components that may be employed in a mobile for use in a wireless communication network. A module 802 for receiving assistance data that identifies a first neighbor cell may correspond at least in some aspects to, for example, the transceiver 770, the CPU 720, and/or the position determination unit 725 of FIG. 7. A module 804 for obtaining a first cell property of the first neighbor cell may correspond at least in some aspects to, for example, the transceiver 770, the CPU 720 and/or memory 730 of mobile device 700 of FIG. 7. A module 806 for adjusting a duration of a first measurement gap in response to the first cell property may correspond at least in some aspects to, for example, the CPU 720, the position determination unit 725, and/or memory 730 of mobile device 700 of FIG. 7.

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, firmware, or software in combination with hardware and/or firmware depends upon the particular application and design constraints imposed on the overall system. Skilled artisans may implement the described functionality in varying ways for each particular application, but such implementation decisions should not be interpreted as causing a departure from the scope of the present description.

While the foregoing disclosure shows illustrative embodiments, it should be noted that various changes and modifications could be made herein without departing from the scope of the currently claimed subject matter. The functions, steps and/or actions of the method claims in accordance with the embodiments described herein need not be performed in any particular order. Furthermore, although elements may be described or claimed in the singular, the plural is contemplated unless limitation to the singular is explicitly stated.

What is claimed is:

1. A method for performing inter-frequency positioning measurements on positioning signals periodically transmitted by at least some of a plurality of cells in a wireless communication network, the method comprising:
   receiving, at a mobile device, assistance data that identifies a first neighbor cell and a second neighbor cell of the plurality of cells, wherein the first neighbor cell transmits a first positioning signal at a first frequency and the second neighbor cell transmits a second positioning signal at a second frequency that is different than the first frequency;
   obtaining, at the mobile device, a first cell property of the first neighbor cell and a second cell property of the second neighbor cell;
   adjusting, at the mobile device, a duration of a first measurement gap in response to the first cell property, wherein the first measurement gap corresponds to a time period during which the mobile device is to perform positioning measurements of the first positioning signal; and
   adjusting, at the mobile device, a duration of a second measurement gap in response to the second cell property, wherein the second measurement gap corresponds to a time period during which the mobile device is to perform positioning measurements of the second positioning signal.

2. The method of claim 1, wherein obtaining the first cell property and the second cell property includes retrieving the first cell property and the second cell property from the assistance data.

3. The method of claim 1, wherein the duration of the first measurement gap is different than the duration of the second measurement gap.

4. The method of claim 1, wherein the first cell property indicates a number of consecutive subframes of the first positioning signal used for positioning measurements.

5. The method of claim 4, wherein the first positioning signal is a position reference signal (PRS) and wherein the first cell property is an Nprs value of the PRS.

6. The method of claim 1, further comprising:
obtaining at least one additional cell property of the first neighbor cell; and
adjusting a start time of the first measurement gap based on the at least one additional cell property.

7. The method of claim 6, wherein the at least one additional cell property indicates a subframe index of the first positioning signal used for positioning measurements.

8. The method of claim 7, wherein the first positioning signal is a position reference signal (PRS) and wherein the at least one additional cell property is an Iprs value of the PRS.

9. The method of claim 6, further comprising:
obtaining at least one additional cell property of the second neighbor cell, wherein the at least one additional cell property of the first neighbor cell indicates whether the first neighbor cell is configured to communicate on the wireless communication network according to a time division duplex (TDD) wireless protocol, and wherein the at least one additional cell property of the second neighbor cell indicates whether the second neighbor cell is configured to communicate on the wireless communication network according to the TDD wireless protocol.

10. The method of claim 9, wherein the at least one additional cell property of the first neighbor cell indicates that the first neighbor cell is configured to communicate on the wireless communication network according to the TDD wireless protocol, and wherein the at least one additional cell property of the second neighbor cell is configured to communicate on the wireless communication network according to a frequency division duplex (FDD) wireless protocol.

11. The method of claim 10, further comprising:
prioritizing positioning measurements of positioning signals transmitted by neighbor cells configured to communicate according to the TDD wireless protocol over neighbor cells configured to communicate according to the FDD wireless protocol.

12. The method of claim 1, further comprising:
obtaining, at the mobile device, an uplink-downlink (UL-DL) configuration type of the first positioning signal; and
adjusting a start time of the first measurement gap based on the UL-DL configuration type of the first positioning signal.

13. The method of claim 1, further comprising:
obtaining, at the mobile device, an uplink-downlink (UL-DL) configuration type of a second positioning signal transmitted by a second neighbor cell;
determining, by the mobile device, whether the duration of the first measurement gap for the first positioning signal aligns with an uplink (UL) subframe of the second neighbor cell based on the UL-DL configuration type of the second positioning signal; and
selecting the first neighbor cell for positioning measurements by the mobile device in response to determining that the reduced duration of the first measurement gap aligns with the UL subframe of the second neighbor cell.

14. The method of claim 1, further comprising:
receiving and decoding the first positioning signal transmitted at a first frequency during the first measurement gap to determine a first time of arrival of the first positioning signal; and receiving and decoding a second positioning signal transmitted by a second neighbor cell at a second frequency during a second measurement gap that is subsequent to the first measurement gap to determine a second time of arrival of the second positioning signal.

15. A mobile device for performing inter-frequency positioning measurements on positioning signals periodically transmitted by at least some of a plurality of cells in a wireless communication network, the mobile device comprising:
memory adapted to store program code; and
a processing unit coupled to the memory to access and execute instructions included in the program code to direct the mobile device to:
receive assistance data that identifies a first neighbor cell of the plurality of cells, wherein the first neighbor cell transmits a first positioning signal;
obtain a first cell property of the first neighbor cell;
adjust a duration of a first measurement gap in response to the first cell property, wherein the first measurement gap corresponds to a time period during which the mobile device is to perform positioning measurements of the first positioning signal;
obtain at least one additional cell property of one or more of the plurality of cells, wherein the at least one additional cell property indicates whether a respective neighbor cell of the plurality of cells is configured to communicate on the wireless communication network according to a time division duplex (TDD) wireless protocol or according to a frequency division duplex (FDD) wireless protocol; and
prioritize positioning measurements of positioning signals transmitted by neighbor cells configured to communicate according to the TDD wireless protocol over neighbor cells configured to communicate according to the FDD wireless protocol.

16. The mobile device of claim 15, wherein the first cell property indicates a number of consecutive subframes of the first positioning signal used for positioning measurements.

17. The mobile device of claim 16, wherein the first positioning signal is a position reference signal (PRS) and wherein the first cell property is an Nprs value of the PRS.

18. The mobile device of claim 15, wherein the program code further comprises instructions to direct the mobile device to:
obtain at least one additional cell property of the first neighbor cell; and
adjust a start time of the first measurement gap based on the at least one additional cell property.

19. The mobile device of claim 18, wherein the at least one additional cell property indicates a subframe index of the first positioning signal used for positioning measurements.

20. The mobile device of claim 19, wherein the first positioning signal is a position reference signal (PRS) and wherein the at least one additional cell property is an Iprs value of the PRS.

21. The mobile device of claim 15, wherein the program code further comprises instructions to direct the mobile device to:
obtain an uplink-downlink (UL-DL) configuration type of the first positioning signal; and
adjust a start time of the first measurement gap based on the UL-DL configuration type of the first positioning signal.

22. The mobile device of claim 15, wherein the program code further comprises instructions to direct the mobile device to:
   receive and decode the first positioning signal transmitted at a first frequency during the first measurement gap to determine a first time of arrival of the first positioning signal; and
   receive and decode a second positioning signal transmitted by a second neighbor cell at a second frequency during a second measurement gap that is subsequent to the first measurement gap to determine a second time of arrival of the second positioning signal.

23. A mobile device for performing inter-frequency positioning measurements on positioning signals periodically transmitted by at least some of a plurality of cells in a wireless communication network, the mobile device comprising:
   means for receiving, at the mobile device, assistance data that identifies a first neighbor cell and a second neighbor cell of the plurality of cells, wherein the first neighbor cell transmits a first positioning signal at a first frequency and the second neighbor cell transmits a second positioning signal at a second frequency that is different than the first frequency;
   means for obtaining, at the mobile device, a first cell property of the first neighbor cell and a second cell property of the second neighbor cell;
   means for adjusting, at the mobile device, a duration of a first measurement gap in response to the first cell property, wherein the first measurement gap corresponds to a time period during which the mobile device is to perform positioning measurements of the first positioning signal; and
   means for adjusting a duration of a second measurement gap in response to the second cell property, wherein the second measurement gap corresponds to a time period during which the mobile device is to perform positioning measurements of the second positioning signal.

24. The mobile device of claim 23, wherein the first cell property indicates a number of consecutive subframes of the first positioning signal used for positioning measurements.

25. The mobile device of claim 24, wherein the first positioning signal is a position reference signal (PRS) and wherein the first cell property is an Nprs value of the PRS.

26. A non-transitory computer-readable medium including program code stored thereon for performing inter-frequency positioning measurements on positioning signals periodically transmitted by at least some of a plurality of cells in a wireless communication network, the program code comprising instructions to:
   receive, at a mobile device, assistance data that identifies a first neighbor cell and a second neighbor cell of the plurality of cells, wherein the first neighbor cell transmits a first positioning signal at a first frequency and the second neighbor cell transmits a second positioning signal at a second frequency that is different than the first frequency;
   obtain, at the mobile device, a first cell property of the first neighbor cell and a second cell property of the second neighbor cell;
   adjust, at the mobile device, a duration of a first measurement gap in response to the first cell property, wherein the first measurement gap corresponds to a time period during which the mobile device is to perform positioning measurements of the first positioning signal; and
   adjust, at the mobile device, a duration of a second measurement gap in response to the second cell property, wherein the second measurement gap corresponds to a time period during which the mobile device is to perform positioning measurements of the second positioning signal.

27. The non-transitory computer-readable medium of claim 26, wherein the first cell property indicates a number of consecutive subframes of the first positioning signal used for positioning measurements.

28. The non-transitory computer-readable medium of claim 27, wherein the first positioning signal is a position reference signal (PRS) and wherein the first cell property is an Nprs value of the PRS.

* * * * *